United States Patent
Koerner

(10) Patent No.: US 8,613,036 B2
(45) Date of Patent: Dec. 17, 2013

(54) DEVICE FOR CONNECTION TO A TELEVISION SET AND METHOD OF TRANSMITTING ADDITIONAL INFORMATION FOR THE TELEVISION SIGNAL

(75) Inventor: Martin Koerner, Windach (DE)

(73) Assignee: MEDmedia GmbH, Furth im Wald (DE)

( * ) Notice: Subject to any disclaimer, the term of this patent is extended or adjusted under 35 U.S.C. 154(b) by 953 days.

(21) Appl. No.: 12/597,199

(22) PCT Filed: Apr. 25, 2008

(86) PCT No.: PCT/EP2008/003379
§ 371 (c)(1),
(2), (4) Date: Oct. 23, 2009

(87) PCT Pub. No.: WO2008/131934
PCT Pub. Date: Nov. 6, 2008

(65) Prior Publication Data
US 2010/0088720 A1   Apr. 8, 2010

(30) Foreign Application Priority Data

Apr. 27, 2007   (DE) .................. 10 2007 020 435

(51) Int. Cl.
*H04N 5/445* (2011.01)
*H04N 7/173* (2011.01)
*H04N 7/16* (2011.01)

(52) U.S. Cl.
USPC ................ 725/135; 725/40; 725/45; 725/46; 725/51; 725/109

(58) Field of Classification Search
USPC .................... 725/40, 44–46, 51, 109, 135
See application file for complete search history.

(56) References Cited

U.S. PATENT DOCUMENTS

| | | | |
|---|---|---|---|
| 5,929,849 A | 7/1999 | Kikinis | 345/327 |
| 7,103,904 B1 | 9/2006 | Blackketter et al. | 725/32 |
| 7,373,336 B2 | 5/2008 | Jasinschi et al. | |
| 8,020,183 B2 * | 9/2011 | Ferman et al. | 725/46 |
| 2002/0154039 A1 | 10/2002 | Lambert et al. | |
| 2002/0157092 A1 | 10/2002 | Kitsukawa et al. | 725/9 |
| 2002/0194601 A1 * | 12/2002 | Perkes et al. | 725/44 |
| 2003/0108022 A1 | 6/2003 | Yamamoto | 370/338 |
| 2003/0229629 A1 | 12/2003 | Jasinschi et al. | 707/3 |
| 2004/0025189 A1 | 2/2004 | Bauersachs et al. | 725/133 |
| 2005/0125455 A1 | 6/2005 | Auger et al. | 707/200 |
| 2005/0149982 A1 | 7/2005 | Perlman | 725/119 |
| 2006/0242681 A1 * | 10/2006 | Brain et al. | 725/109 |
| 2009/0119717 A1 | 5/2009 | Newton et al. | 725/59 |
| 2009/0219039 A1 | 9/2009 | Fasshauer | |

\* cited by examiner

FOREIGN PATENT DOCUMENTS

| | | |
|---|---|---|
| DE | 102005003488 A1 | 3/2006 |
| WO | WO 0241542 | 5/2002 |
| WO | 2009153332 A2 | 12/2009 |

*Primary Examiner* — Kieu Oanh T Bui
(74) *Attorney, Agent, or Firm* — Andrew Wilford

(57) ABSTRACT

A method of obtaining, preparing and visually displaying additional information on a continuous reproduction of electronic media, picture reproduction, or sound reproduction on an ongoing television program, comprises first analyzing program information from the ongoing program or of highlighted additional data to the ongoing program. Then additional information obtained from databases, from a public data network or from other sources of information subject to the program information is made available and optically prepared. This the prepared and obtained data for the additional information is then linked with manually or automatically related metadata. Finally, search criteria are linked with metadata related to individual search criteria, terms, partial entries in search criteria, or a combination thereof.

13 Claims, 7 Drawing Sheets

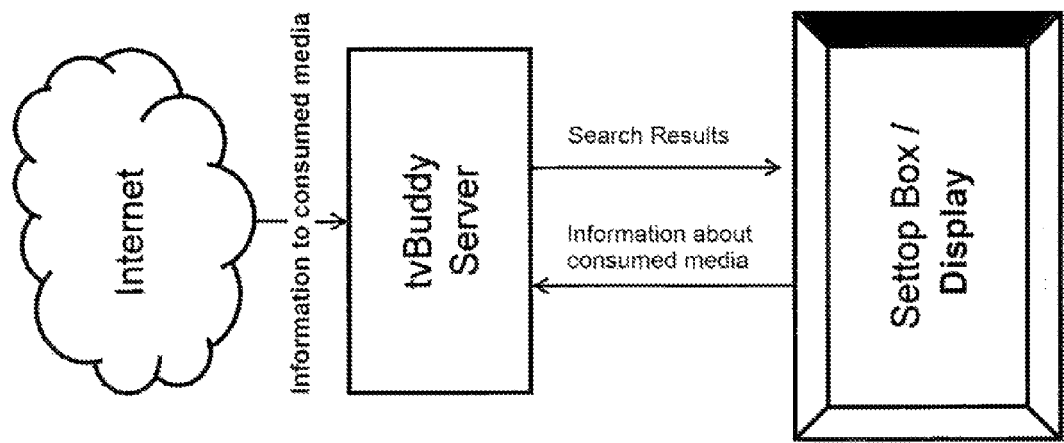
Fig. 1: Overview

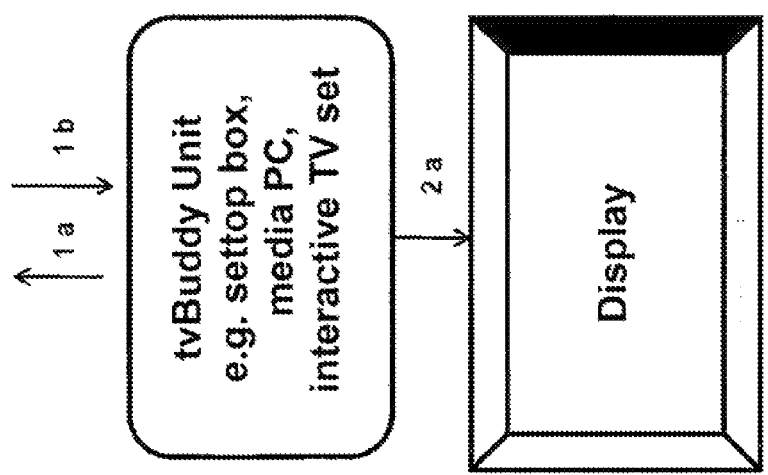
Fig. 2: Client Request
1a: Search request with search items
1b: Response of tvBuddy in client-appropriate format
2a: Settop box puts information on display

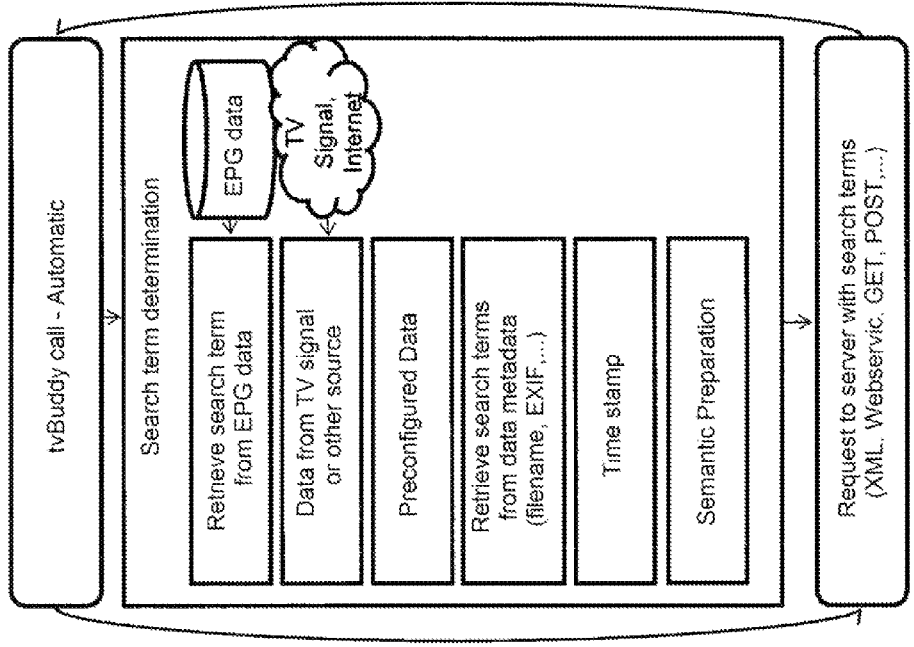
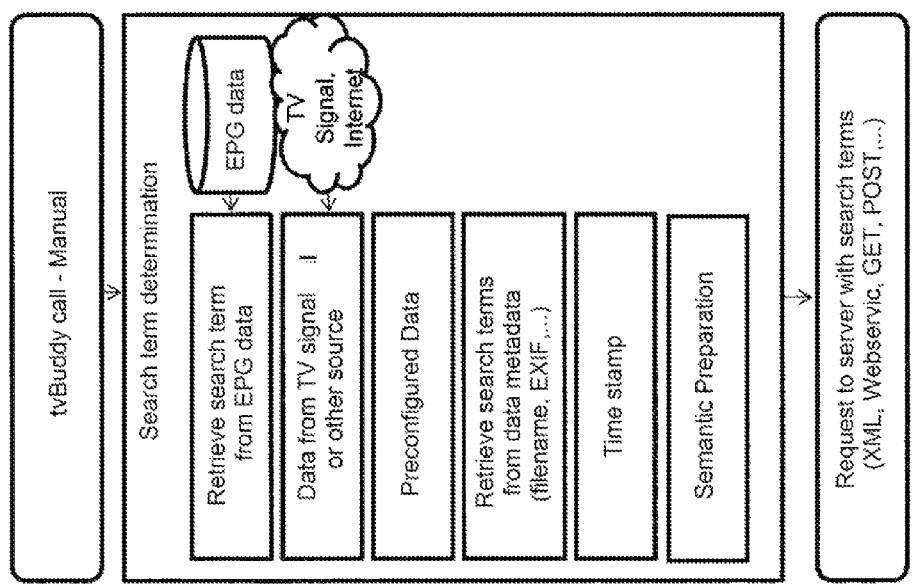

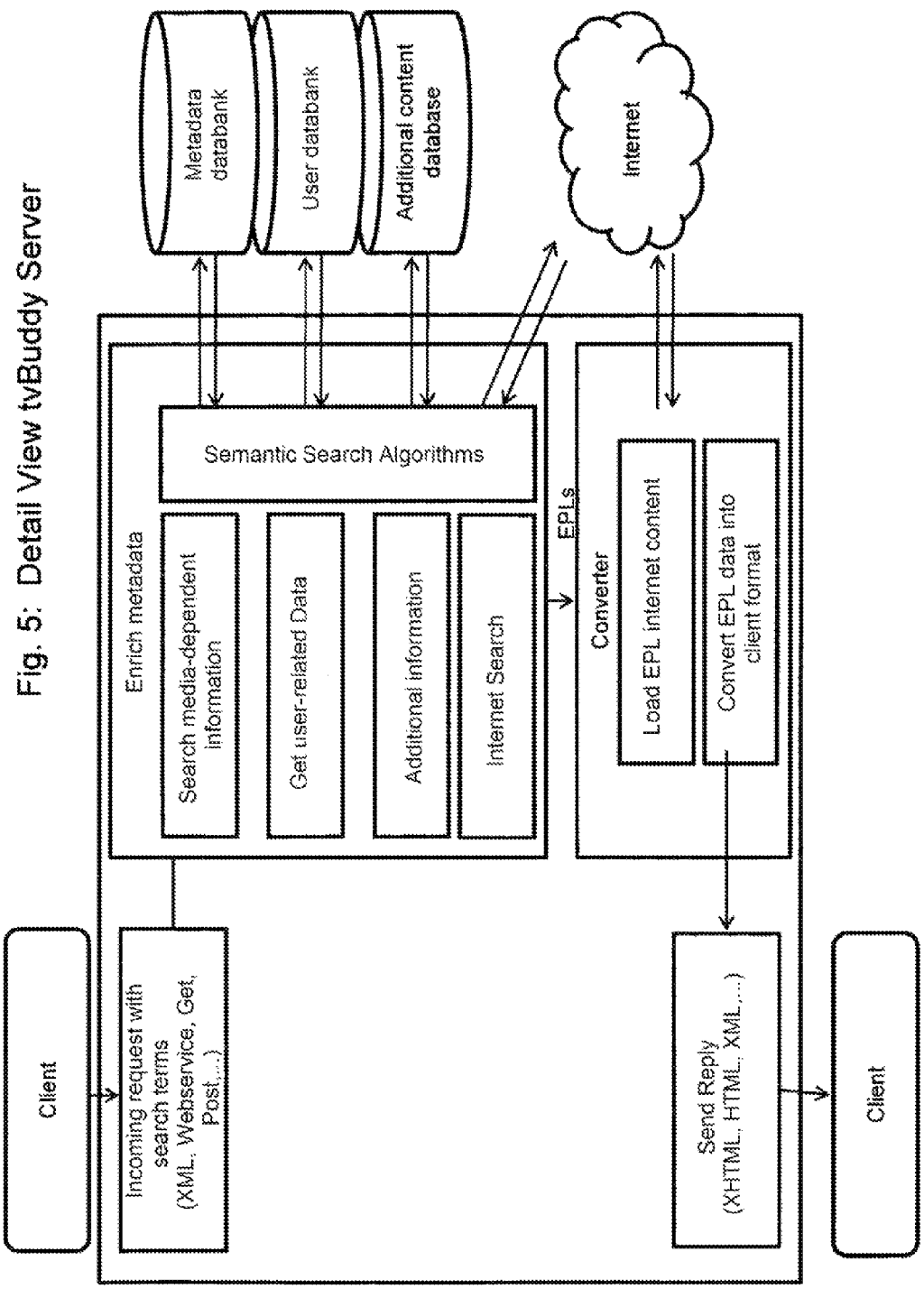
Fig. 5: Detail View tvBuddy Server

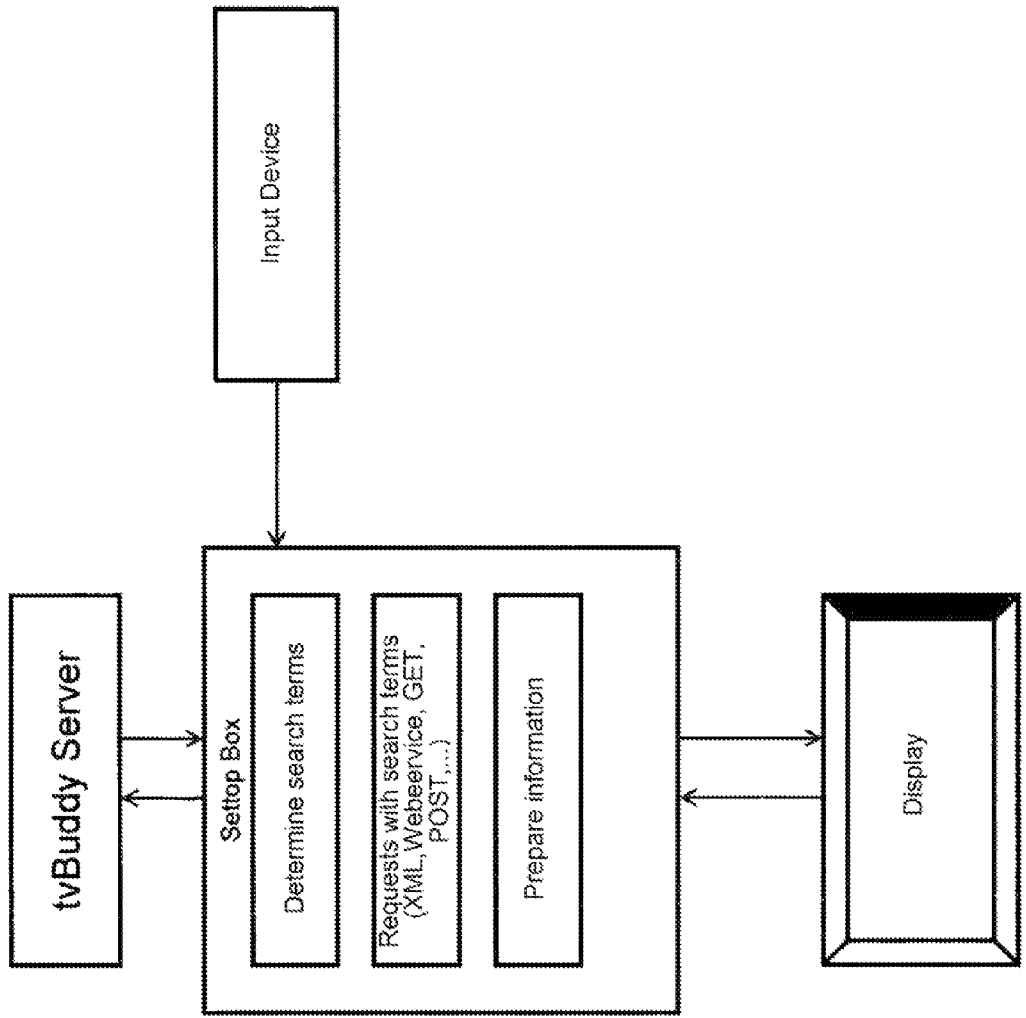
Fig. 6: Detail View tvBuddy Settop Box

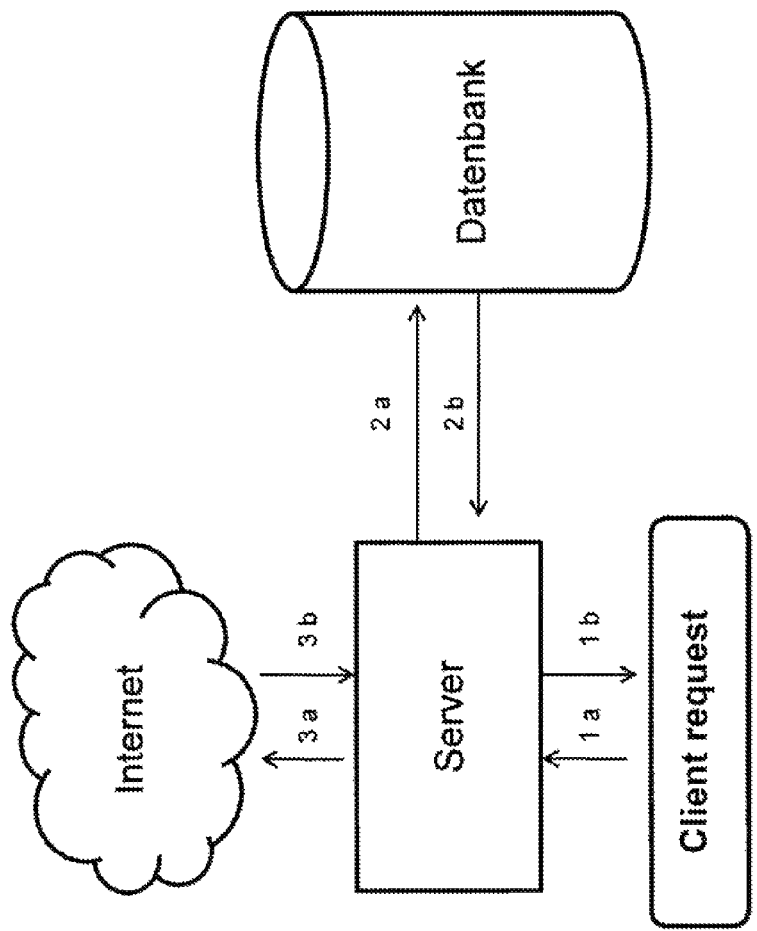

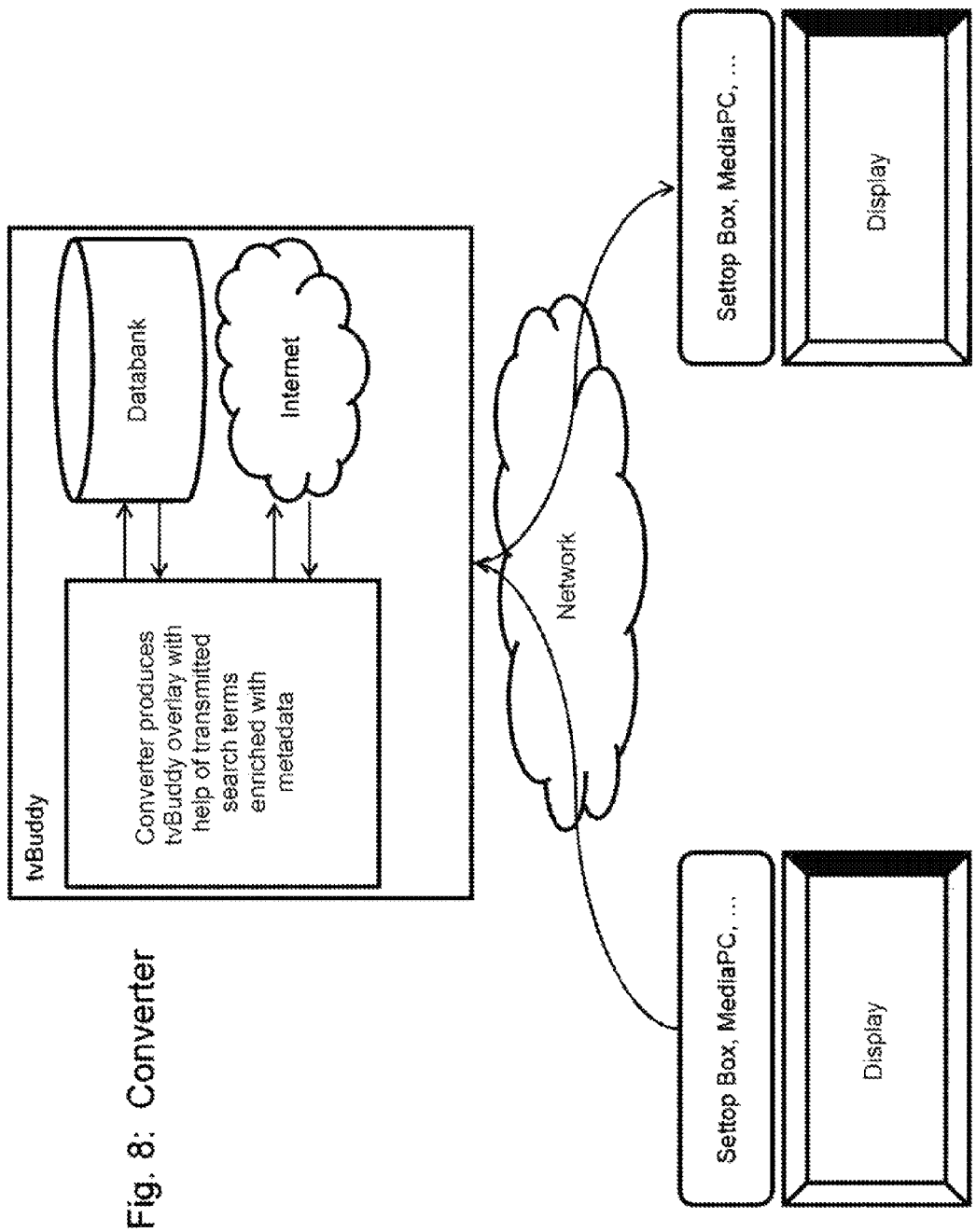
Fig. 8: Converter

DEVICE FOR CONNECTION TO A TELEVISION SET AND METHOD OF TRANSMITTING ADDITIONAL INFORMATION FOR THE TELEVISION SIGNAL

CROSS REFERENCE TO RELATED APPLICATIONS

This application is the US national phase of PCT application PCT/EP2008/003379, filed 25 Apr. 2008, published 6 Nov. 2008 as WO2008/131934, and claiming the priority of German patent application 102007020435.5 itself filed 27 Apr. 2007, whose entire disclosures are herewith incorporated by reference.

The present invention refers to possibilities of interactive television and relates to an additional device for connection to a television set according to preamble of claim 1 as well as a method of the transfer of additional information to a television signal.

The transfer of television signals can be carried out either by radio or wire. Television signals serve for the transfer of previously generated images, television programs and information based on images, highlighted with sound signals, to a large number of users, the so called television viewers. The images are centrally produced, and uniformly transferred and passed to the users. An individual choice of different contents can be carried is out with this type of signal generation, transfer and signal use exclusively by the selection of a determined number of a majority of different programs which are available.

For a few years, communication increasingly takes place via decentralized computer networks via the so called internet, for example, which links a great number of single computers with each other and thus makes communication available. Since the internet is being increasingly used for forwarding and transferring contents of any kind in a wide range of varieties of preparation, too, it partially can replenish the traditional television set and even partially replace it respectively. The typical use of the contents available on the internet differs, however, in significant points from the almost purely passive use of television programs.

So far, the television end consumer and internet end consumer uses two different devices, in order to use television programs, and to access and retrieve internet information respectively. Therefore, the user needs two devices and has to keep them at home. Since both devices are situated in many households in different rooms, it is difficult for the user to receive additional information on the programs just watched on television. This stands for a serious media discontinuity for the consumer, at least for today's widespread use of both types of media.

So far, no possibility exists to link the programs watched on television or other media directly on the screen with other information made available on the internet. Although ideas are developed worldwide, no respective devices or methods are yet available or even obtainable on the market.

WO 02/087239 A1 describes a possibility of the interactive use of a television signal, in which contents from the internet are displayed on the screen. The device controls and stores viewed programs by the user, determines future times of use, and downloads information available for that purpose on the internet in its storage already before.

DE 100 58 347 A1 describes a box set device for a personal computer for its connection with a television set. The box set device can operate the personal computer directly via the television.

US 2005/0125455 A1 describes a method of interactive television, with which several users can participate in a game with each other. The main focus of this method lies in the provision of games via television.

US 2003/0108022 A1 describes a method, in which contents are marked on television and this marking is sent to a server. This information can be retrieved at a later stage from any end device.

From WO 98/17 064 A1 a method is known, in which a definitely attributed message is transferred via the television signal to the user. This definite attribution to a certain user is a mandatory requirement.

Furthermore, WO 97/41 690 A1 describes a method, in which objects or image frames are linked with a fixed URL on television. A semantic search and attribution of links is not possible.

WO 01/01686 A1 discloses a method, in which firmly defined templates are available on a set top box. If necessary, these templates are overlaid in order to advertise commercial breaks. The signals for advertising the templates are transmitted by the television signal to the set top box.

Finally, WO 00/16 556 A1 describes a connection device for so called home entertainment devices. The device can control several media devices at the same time. The functions of the devices are combined in this device.

The object of the invention is to create an additional device for a television, which enables the user to retrieve parallel offers on the internet, and allows the user different continuative action at the same time. This object of the invention is achieved with the preamble of the independent claim. Features of advantageous embodiments of the invention result from the dependent claims.

The enormous benefit of the invention is to create a direct linking of television programs and other media with contents, which are available on the internet and match with the television programs, and to prepare them for the user in a suitable way. As for the additional device according to the invention, which enables this functionality, the additional device is a so called set top box with an enlarged functional range according to this patent. This set top box is further referred to as tvBuddy set top box or simply tvBuddy.

The present invention serves for uniting the advantages of television and internet in one device for the user.

The user can watch a television program in the traditional way, wherein an additional device, namely the above-mentioned tvBuddy set top box, is connected to the television set according to the present invention. This set top box has the following possibilities for processing of media:

1. Reception of broadcasting stations. Thereby, this reception can be carried out via all possible channels such as satellite, wire or aerial. However, also IPTV is possible. The technical device for receiving and preparing the television signal can also be transferred into a further external device. The reception of the broadcasting stations can also be carried out directly via the television. Then, the television transmits on the signal to the set top box for preparation. Alternatively, the television can also forward only these types of information for preparation relevant for the tvBuddy set top box.
2. Preparation of video media of any kind. These can be, for example, video DVDs or the like.
3. Preparation of images of any kind, particularly of photos.
4. Preparation of audio media of any kind, such as pieces of music or other audio pieces, too.

Thereby, the mode of transmission or the mode of storage is generally insignificant. The display is generally carried out via a television set. Alternatively or in addition to the above-described, the set top box can provide a possibility of its own for displaying the medium. The functions and functionalities of the tvBuddy set top box can also be directly integrated into the television, so that no additional device is necessary. In this alternative embodiment, however, the functionalities are identical.

If the user would like to obtain and use background information on the currently ongoing media reproduction, then he activates the tvBuddy functions on the tvBuddy set top box via his remote control. According to another embodiment of this invention, the tvBuddy can automatically be laid over the current television frame and display information.

An important component with the mode of operation of the method according to the invention is obtaining and using of relevant search data. The tvBuddy collects search data for creating the information requested from the following sources:

1. An electronic program guide (EPG—Electronic Program Guide). The electronic program guide contains data on the current broadcast and also on future broadcasts respectively, which are broadcasted together with the television program.
2. Pre-configured data on the tvBuddy client. The linking of the stored time slots (television program channel number) and a respective broadcast station names, as well as advanced information and tags on this entry is an example for that; further pre-configured data on the tvBuddy set top box can also be regional information or also information on the person and/or persons, who use/are using tvBuddy; this listing is not limited and servers for clarification purposes;
3. Information and tags broadcasted via the television signal; the transmission of this information and tags is not exclusively bound to the television signal. This transmission can be carried out also via other means of transmission;
4. Information and tags, which are directly integrated in the media;
5. The current time and date.

The total of this collected information, optionally also any combinations of this data and/or of parts of this data are referred to in the following invention at hand as search data.

These search data on a current ongoing program and current media reproduction respectively are now taken over by tvBuddy. This means that the search data are sent to the tvBuddy server.

Another important amendment can be the use of so called metadata. In addition to the search data, further metaterms can be defined in tvBuddy. Likewise, this manually or automatically allocated metaterms are included into the search.

These metaterms can have a temporary time limit (from-to), regional classification and further freely defined parameterizations and are related to single search data, terms or partial terms in search data or also combinations thereof. Methods and modes of semantic, too, can be used for this generation of metadata. The term "James Bond 007" could be related, for instance, to the metaterm "BMW® Z3" from the search data.

With the aid of the semantic methods, different travel offers, hotels, flights etc. to Spain, which are offered on the internet, can be related, for example, to a travel program showing documentations on Spain. Search results on Spain, such as Spanish news or current Spanish sports results are hereby faded out, since they are of no importance for the user at this point. The user rather looks for travel and holiday resorts in Spain. On the contrary, a Spanish course with the regional adult education center can complete the offer.

The preferences of the user as well as the preferences of other users with a comparable search profile are taken into account with reference to the search results, in order to improve the result significantly and to customize them on the customer.

Personalized information on the respective user can also be stored on the tvBuddy server at the same time. This personalized information can be integrated in the metadata.

These accumulated data are generally referred to in the following invention at hand as metadata.

The use and meaning of so called Electronic Program Links (EPLs) is clarified in the following. The server searches stored information on the detected and beforehand obtained metadata respectively in its data base and on the internet respectively. This information can be linked either automatically or manually is with the metadata. Likewise, methods and modes of semantics can be used again for the search. The results are the Electronic Program Links (EPLs). These EPLs are now prepared by the server. The preparation can also be carried out in such a way that information of the data, onto which the links refers to, is directly readout and prepared as preview information. The prepared EPLs are transferred to the customer afterwards. The user presents the results (prepared EPLs) in an optimized way for the end device. The user can now choose single results from these EPLs and retrieve them.

The mode of operation and the advantageous possibilities of use of the method according to the invention as well as of the additional advice according to the invention are described the following.

The additional device offers a good possibility for portal connection with special information. The tvBuddy server also searches for metadata in different data bases of the internet and displays the results found therein. For example, background data bases on movies, video portals, music portals, and portals in general, online shops etc. are browsed and made available to the user in a suitable way, particularly prepared optically and made accessible for interactive use.

Furthermore, a simple possibility for shop links is given. The tvBuddy server also searches for metadata in different shops and in a special shop and displays the results found. For example, an online shop searches for metadata, and the articles is found therein are offered for direct sale in tvBuddy.

By linking television sets and the metadata, the information from television and internet merge. Therefore, the television can be used further on. Individual and personalized services from the internet can be offered via the television, for example. These new home entertainment devices can replace hard drive receivers, DVD writers and hi-fi stereo systems, since they combine all functions or extend these devices about the functions of the tvBuddy. Thus, the television set turns from a passive medium to a communication center for the whole family.

The new device servers for the enrichment of consumed media by interactive functionalities from the internet. Therefore, many new functions are accessible with normal television the download of background information and further trailers for ongoing broadcasts, for example. This applies to any extent to watching a DVD, for example, or for listening to a piece of music or audio file or the like via the tvBuddy set top box.

A further increase of the convenience of use for the user can be achieved by an automatic activation of the device and method respectively. As an extension for activating the tvBuddy via a remote control or via another user interaction, the tvBuddy set top box can send ongoing search terms on the current watched medium or media to the tvBuddy server. The server enriches these with metadata then. With the metadata, the server searches then ongoing its own databases and the internet, and sends suitable EPLs to the user if necessary. The user shows these then in addition to the current medium or the current media. The user can be informed in this way also automatically on information to the current broadcast or other consumed media, too.

In this connection, also information liable to pay costs can be retrieved, for example, testing results of Stiftung Warentest and so on. In order to avoid high costs or even a cost explosion for the user, the device can be preset in such a way that it does generally not retrieve information liable to pay costs, or that it informs the user before retrieving offers liable to pay costs by means of a message which needs to be acknowledged by the user. Furthermore, a contextual linking to internet portals is possible. Besides the linking to game shows, further utilizations are possible.

Furthermore, the device can also develop useful functions during advertisement breaks. For instance, the device can enable quick orders ("click and buy"), supply the television viewer with information on surveys and on market research to the products just advertised on television, request samples and trial packages respectively, book test drives or product demonstrations, establish linkings to further product information (travelling, product configuration, . . . ) etc. A further application of use is the recall of context related advertisement to a currently viewed program. The usage of the additional device is broad. It can be used during ongoing television program, advertisement breaks, home shopping, in portals and for facilitation of communication.

Background information can be retrieved, for example, during ongoing television program on the broadcasted program. Thereby, the background information can be for instance further editorial articles, particularly with information programs (programs on legal issues for example). This information may be both free of charge and with costs (Stiftung Warentest for example).

As for movies, ongoing trailers on how the television program has been created, interviews with the actors etc. can be retrieved, for example. A linking to internet pages is also possible, for example to the homepage of the currently viewed television program or a linking to game shows (Who wants to be a millionaire, voting results etc. for instance).

Furthermore, the access can also be carried out on program related advertisement. If the television viewer watches a tennis match at the moment, he or she can retrieve information on tennis trips, tickets for Wimbledon, tennis rackets, tennis shoes etc, for instance.

Likewise, a linking with portals is possible. If the television viewer watches advertisement on a movie, for instance, then he can retrieve with the additional device the current movie trailer, the cinema program of his town etc. and directly book cinema tickets, for example.

If the television viewer watches the weather forecast, he can retrieve in addition the current weather forecast for a place of his own choice (the weather forecast of his resort, for example). Tremendous amendments to today's standard result in advertisement by using the additional device "tvBuddy". A direct measurement of the advertisement success is enabled by means of the feedback with the customer. The customer can contact the advertisers immediately. The purchase process including payment can be carried out in an interactive way.

A broad audience can be addressed by the broadcast via the television signal. Besides, the purchase is facilitated since the customer does not have to go into the respective shop in order to buy the desired product. He orders the desired product directly at home to where the product is delivered.

A further advantage results in the scope of advertisement for internet offers. The internet offers were relatively useless on television since the direct relationship could not have been established. With the method according to the invention and the additional device, a direct linking is also possible for those users who are still not familiar with the internet and largely inexperienced. The additional device for a television according to the invention has a broad advantage for the end consumer. The living room with the television is generally the center in the family's flat. If additional information is required, a personal computer with internet access which is frequently located in another room (study) is accessed. A media discontinuity arises at this point which lead to the fact that the consumers do not use the offered information and usage is possible with a considerable additional effort respectively. By using tvBuddy, this additional effort is omitted.

The additional device offers a simplified access to the internet. Besides, it features an easy operation. By the additional device the internet and the television grow together, that means that the internet is brought directly into the living room and enables an easy retrieve of additional information and value added services. This device is also useful for the service provider and/or for advertisers since it offers a direct channel to the end consumer. The large scope of the television can even be better used for advertisements. Furthermore, a direct feedback from the end consumer and a direct interaction with the end consumer respectively takes place. The end consumer can, for instance, buy the product directly or request samples or arrange a test drive with a car manufacturer. The easy use increases the willingness of the end consumer to use the offers.

Furthermore, the additional device enables the usage of the internet for personalized information. Besides, the internet permits the easy access on existing systems (shopping systems, methods of payment and so on).

The advantage for television broadcasters is particularly the additional benefit for the television viewers and advertisers. The television broadcasters can, for example, take a stake on the revenue of the products, which are sold when using the additional device. Besides, the television broadcasters can raise fees and a surcharge for the service and additionally to the advertisement costs.

The additional device leads to a higher advertisement quote and therewith to a higher turnover in advertising. Furthermore, it enables a significantly improved traceability of advertisement efficiency.

The additional device has access to the internet and to a is browser and is being described as tvBuddy, set top box, home entertainment device or media receiver.

The tvBuddy set top box can have a DVB-T, DVB-S or DVB-C connection, via which the tvBuddy receives the television signal. The tvBuddy set top box can be provided with further appliances for replaying media (such as a DVD drive, USB connection or the like). Furthermore, the consumer needs internet access, such as one DSL connection. The linking to the internet can be carried out via LAN wire or WLAN or the like. The display device which is available in the additional device must display the EPLs provided by the tvBuddy server at the output device.

The input and operation can optionally be carried out via a remote control, a keyboard, mouse or other input devices and/or input appliances, too. Thus, also a speech input and/or speech control of the additional device according to the invention can make sense, for example.

If it is mostly spoken of the reproduction of television programs and the linking of television programs and internet contents in the context at hand, this is not regarded as limiting the invention. The method according to the invention and the system according to the invention can generally be combined with all possible types of media reproductions (sound and/or vision) as they have already been described above.

Further features, objects and advantages of the present invention are now explained in greater detail according to a preferred embodiment of the invention which should not be regarded as limiting the invention and refers to the accompanying figures. Same reference numbers refer to same elements throughout the various figures and are not explained repeatedly.

FIG. 1 shows a schematic diagram of the various components which are necessary for the realization of the system according to the invention.

FIG. 2 shows exemplarily a search request of a user with the help of an additional device (tvBuddy) which is connected to a television.

FIG. 3 shows in a schematic block diagram a so called client request which is manually released.

FIG. 4 shows in a further schematic block diagram an automatically generated client request.

FIG. 5 shows in a schematic block diagram the structure and function of a so called tvBuddy server which serves for obtaining and preparing information from a public data network.

FIG. 6 shows in a schematic block diagram the structure and function of the tvBuddy set top box which is coupled with the television set of the user.

FIG. 7 shows in a schematic embodiment the connection of the requests and the communication of the server with further devices and data networks.

FIG. 8 shows the connections of several additional devices with a centralized data network.

Due to the schematic block diagrams of the FIGS. 1 to 8, an embodiment of the system according to the invention as well as of the composition and connection respectively of the various is devices is illustrated which are necessary for the preparation and visual display of additional information to a television signal. Thus, FIG. 1 shows a schematic diagram of the various components which are necessary for the conversion of the method according to the invention. A tvBuddy server is a connection between an end consumer with a television set and a public data network (the internet for example). When watching a television program with a conventional television with a television screen, his set top box (tvBuddy) is a connection to the tvBuddy server and sends information to the end consumer regarding the current consumed media. The tvBuddy server finds useful information on the currently consumed media via the internet and provides the set top box with the prepared searching results, wherein the set top box is able to prepare the searching results for a presentation on the screen in a suitable graphical way.

The embodiment of FIG. 2 shows exemplarily a search request of a user with the help of an additional device (tvBuddy) which is connected to a television. The additional device can optionally be a tvBuddy unit, a so called set top box, a media PC, an interactive television set or the like. From this unit, a search request 1a with search terms is transmitted to the tvBuddy server (compare FIG. 1). The tvBuddy server sends to the additional device a response 1b in a suitable format, which depends on the customer. The additional device prepares the information in a suitable way and sends the information 2a to the television set so that the contents can be displayed there in a suitable way.

FIG. 3 shows in a schematic block diagram a so called is customer request, which is manually released. After a manually released request of the tvBuddy an attribution and determination of reasonable search terms which are obtained from the EPG data is carried out, wherein the EPG data is available in an EPG data network. Furthermore, data from television signals or other sources can be taken into consideration. Besides, it is possible to obtain pre-configured data and/or search terms from data metadata. The data metadata can be provided with a filename, extensions (EXIF) or the like, for example. In addition, the data can be provided with a timestamp. Finally, these are being prepared with a semantic algorithm when concluding the obtaining of data.

This prepared request is transmitted to the server which can relate the respective chosen and prepared search terms and connect them with data. The data format can be different.

FIG. 4 shows in a further schematic block diagram an automatically generated client request. After the automatic retrieve of the tvBuddy the further search term determination and search term transmittal to the server is carried out in a respective manner as already described on the basis of FIG. 3.

The further FIG. 5 shows in a schematic block diagram the structure and function of a so called tvBuddy server which serves for obtaining information and preparing information from a public data network. If a search request with search terms (in XML, web service, GET, POST or another format) comes in from the individual user, a metadata preparation of these inquiry data is carried out. In connection with this metadata preparation, first of all media dependant information is searched, wherein it is reverted to a metadata network and this information can be supplied. Furthermore, user related data can be determined wherein it is thereby communicated with a user net work. Besides, additional information can be taken into consideration wherein a so called additional content database is accessed. Besides, further metadata can be obtained via an internet research while accessing information which is available on the internet. The entire preparation is carried out using semantic search algorithms.

Finally, the EPLs are transmitted to a converter, wherein the internet contents of the EPL are loaded from the internet. The EPL data are converted in a format which is a readable and compatible format for the client. Finally, a response is generated in XHTML, HTML, XML or the like and transmitted to the client.

FIG. 6 shows in a schematic block diagram the structure and function of the tvBuddy set top box which is coupled with the television set of the user. The determination of search terms is carried out in communication with the tvBuddy server which is released and/or supported by means of a suitable input device if necessary. The requests on the tvBuddy server can be carried out with search terms having the formats XML, web service, GET, POST or other suitable formats. A preparation of the information must be carried out before transmission to the television so that it can be displayed in a correct way and in a format which the user can handle easily.

FIG. 7 shows in a schematic embodiment the connection of the requests and the communication of the server with further devices and data networks. A request 1a with search terms is transmitted from the client to the current medium to the server. The server enhances the search terms with the aid of a data network query 2a with metadata and imports these data back again as electronic program links (EPLs) 2b. Contents from the internet are obtained in one step 3a which are returned as data 3b. Finally, response data 1b from the tvBuddy server are returned to the client.

The schematic embodiment in FIG. 8 finally shows the connections of several additional devices with a centralized data network. Several customers with screens and set top boxes and so called media PCs respectively can be connected via a joint network with a tvBuddy server. Thereby, a converter provides a suitable tvBuddy surface with the aid of transferred search terms which are enriched with metadata. Data from a data network is obtained for this purpose from a data network and from the internet.

In the following, an exemplarily booking of a test drive is described as an example of use. A possible interaction of the additional device according to the invention with the television and information from the internet is described in the individual steps. The additional device (tvBuddy) is connected to a television set and controllable via a remote control. The remote control can be the regular remote control for the television. Alternatively, an additional remote control can be used which is additionally provided with a letter keypad, for example, for a facilitated entering of text such as within the framework of orders and/or shopping. During the ongoing television program, the device receives information on retrievable additional offers via aerial, wire or satellite from the broadcasting station. This information can be retrieved via the internet if the user wishes to do so and if he activates the respective functions via remote control. Thereby, the information is displayed by means of a browser window on the television screen while the ongoing television program continues in a downsized window. Preferably, this activation is carried out, however, automatically (compare FIG. 4).

When booking a test drive, the handling of the whole application can be entirely carried out with the remote control. For entering text, a method of the expedited entering of SMS texts can be used. Alternatively, a wireless keyboard can also be used. All basic data (name, address, telephone number and so on) can be stored in the basic settings so that only minimal inputs are necessary. When broadcasting an advertisement on a certain vehicle, an information button appears at the left side on the bottom of the television screen. The user can either ignore this button or active it by pressing the remote control. Thereby, a dropdown menu appears. The television viewer can choose the requested activity "test drive". Thereupon, a form is displayed into which all the necessary data for a test drive are entered in. The additional device can be programmed in such a way that constant data such as name, telephone number, email address and so on, are already filled in the form, so that the user only chooses and fills in his desired date for carrying out a test drive. By activating a further button reading "getting in and starting off" or "booking a test drive" or the like, the request on a test drive is send to the car manufacturer and/or to the nearest retailer for this make of car.

The car manufacturer and/or the retailer confirm the date via email. Furthermore, the customer can be provided with a product video per video on demand (via internet, DSL) which the customer can watch at home on television together with his family. Thus, a new way of communicating with the customer is created.

The invention is not limited on the embodiments described beforehand. In fact, a plurality of varieties and modifications using the invention at hand is possible. Therefore, the varieties and modifications also lie within the scope of protection.

The invention claimed is:

1. A method of obtaining, preparing and visually displaying additional information on a continuous reproduction of electronic media, picture reproduction, or sound reproduction on an ongoing television program, the method comprising the steps of:

analyzing program information from the ongoing program or of highlighted additional data to the ongoing program;

making available and optically preparing additional information obtained from databases, from a public data network or from other sources of information subject to the program information;

linking the prepared and obtained data for the additional information with manually or automatically related metadata; and linking search criteria with metadata related to individual search criteria, terms, partial entries in search criteria, or a combination thereof.

2. The method of claim 1, in which the metadata are generated and obtained by methods and modes of semantics.

3. The method of claim 1 serving for connecting the media reproduction and the internet, further comprising the step, when an additional device is connected to a media reproduction device and operated by an input device, of:

providing the user with individual or personalized offers related to the chosen reproduction program.

4. The method of 1 serving for the connection of television and internet, further comprising the step, when an additional device is connected to a television operated by an input device, of:

providing the user with individual or personalized offers related to the television program chosen.

5. The method of claim 1 in which individual user data are preset.

6. The method of claim 1 in which the additional device and the method of visualization of individual data, program or user-defined data are being activated automatically by respective signals underlain to the reproduced program.

7. The method of claim 1, further comprising the step, to enable the user to retrieve additional information on the currently broadcasted program, of:

providing the additional information on the internet.

8. The method of claim 1, further comprising the step of:

enabling the user to order products which were just being advertised, to retrieve survey results or market research results on a product, or to order samples and sample packages.

9. The method of claim 1, in which the metadata have a temporary limitation, regional classifications or further freely defined parameterizations.

10. The method of claim 9, in which the classification is carried out by using methods or modes of semantics.

11. A system for obtaining, preparing and visually displaying additional information on a continuous reproduction of an ongoing television program, the system comprising:

means for analyzing program information of the ongoing program or of highlighted additional data to the program;

making available and optically preparing additional information obtained from databases, from a public data network, or from other sources of information related to the program information to the television viewer as an additional information; and means for linking the prepared and obtained data for the additional information with manually or automatically related metadata; and means for linking search criteria with metadata related to individual search criteria, terms, partial entries in search criteria, or a combination thereof.

12. The system of claim 11, in which the classification of the additional information is made by means of methods or modes of semantics.

13. In combination with system of claim 11 to be connected to a media reproduction device, particularly to a television set, which is operated by an input device, particularly by a remote control, and connecting the reproduction device and television set respectively with the internet, wherein the additional device provides the user with individual or personalized offers due to the chosen reproduction program and television program respectively.

* * * * *

UNITED STATES PATENT AND TRADEMARK OFFICE
CERTIFICATE OF CORRECTION

| | |
|---|---|
| PATENT NO. | : 8,613,036 B2 |
| APPLICATION NO. | : 12/597199 |
| DATED | : December 17, 2013 |
| INVENTOR(S) | : Martin Koerner |

Page 1 of 1

It is certified that error appears in the above-identified patent and that said Letters Patent is hereby corrected as shown below:

Title Page, Item (73) ASSIGNEE should read as follows:

--MEKmedia GmbH--.

Signed and Sealed this
Twenty-fifth Day of March, 2014

Michelle K. Lee
*Deputy Director of the United States Patent and Trademark Office*